(12) United States Patent
Bigler (10) Patent No.: US 6,553,724 B1
(45) Date of Patent: Apr. 29, 2003

(54) PANEL AND TRADE SHOW BOOTH MADE THEREFROM

(76) Inventor: Robert A. Bigler, 11230 Bubb Rd., Cupertino, CA (US) 95014

( * ) Notice: Subject to any disclaimer, the term of this patent is extended or adjusted under 35 U.S.C. 154(b) by 78 days.

(21) Appl. No.: 09/835,880

(22) Filed: Apr. 16, 2001

Related U.S. Application Data
(60) Provisional application No. 60/201,890, filed on May 5, 2000.

(51) Int. Cl.$^7$ .................................................. A47F 10/00
(52) U.S. Cl. ....................... 52/36.1; 52/582.1; 52/586.1; 160/135; 403/188; 403/DIG. 1
(58) Field of Search ................................ 52/36.1, 582.1, 52/586.1, 585.1, 782.1, 783.1, 799.1, 800.1, 171.3; 160/135, 371, 377, 353; 403/DIG. 1, 13, 188, 187, 180, 170, 217, 218, 219

(56) References Cited

U.S. PATENT DOCUMENTS

| | | | | |
|---|---|---|---|---|
| 3,889,736 A | * | 6/1975 | Firks ........................... | 160/135 |
| 4,722,146 A | * | 2/1988 | Kemeny ....................... | 40/605 |
| 4,768,748 A | * | 9/1988 | Leimkuhler et al. ........ | 249/192 |
| 5,439,043 A | * | 8/1995 | Carter ......................... | 160/135 |
| 5,570,971 A | * | 11/1996 | Rixen et al. ................. | 403/381 |

* cited by examiner

Primary Examiner—Carl D. Friedman
Assistant Examiner—Naoko Slack
(74) Attorney, Agent, or Firm—Mikio Ishimaru (57) ABSTRACT

A panel is provided, which is a building block, for a trade show booth. Each panel includes a support structure having rails secured to the edges. Each rail has magnetic fastening strips and metal guidance blades disposed in the lengthwise extending slots, which engage with similar structures in other panels or other rails. Separate rails have mutually engageable lobes and lobe-engaging openings to allow a plurality of panels to be placed in any trade show booth configuration.

15 Claims, 5 Drawing Sheets

PANEL AND TRADE SHOW BOOTH MADE THEREFROM

CROSS-REFERENCE TO RELATED APPLICATION(S)

This application claims the benefit of U.S. Provisional patent application Ser. No. 60/201,890 filed May 5, 2000.

TECHNICAL FIELD

The present invention relates generally to trade show booths, and more particularly to a panel for a display structure and trade show booth.

BACKGROUND ART

In the past, most trade shows were for wholesalers who required only a table to display a few samples of their goods. Over time, these trade shows have become major exhibitions for both wholesalers and retailers to bring all their goods to the view of the purchasing public and even to make sales with large displays and large booths.

The earlier solutions for booths usually covered an area of approximately ten feet by ten feet and were relatively flimsy in construction. Various types of hinged and screwed-together structures were developed. However, none of these booths were intended for large areas, which are greater than twenty feet by twenty feet.

To meet the requirements of larger areas, larger and stronger booths were required. This resulted in heavier booths which required assembly. The booths were so heavy that several standard four by four by six foot crates were required to transport the components. The crates were expensive to ship and required lift-trucks to move them to the booth area in a trade show.

Further, the larger booths required a great deal of manpower at the trade show in order to lift the various components into place and then to assemble them. Often tools and complex instructions for the workers at the trade show were required.

The larger booths were expensive and often not cosmetic on the reverse side. In order to render the back side colorful and presentable, additional components were required Finally, the larger booths were inflexible and did not allow multiple configurations, which would be required because of the different products being presented or the location on the trade show floor.

While the larger trade shows have been going on for many years, a trade show booth has long been desired which would be capable of covering a large area, but remain flexible both in size and in multiple configurations. Ideally, the components could be packed into standard size crates and preferably one crate, so as to be inexpensive for storage and shipment purposes. Each component of the system would ideally have a weight of less than fifteen pounds to minimize labor and assembly costs and require no additional tools for assembly. A design, which would be good in appearance both front and back and be flexible in color, has long been desired. Finally, the ideal system would be relatively inexpensive. Unfortunately, a trade show booth, which could meet these requirements, has long been sought but has equally long eluded those skilled in the art.

DISCLOSURE OF THE INVENTION

The present invention provides a panel, which is a building block, for a trade show booth or office cubicle. Each panel includes a support structure having rails secured to the edges. Each rail has magnetic fastening strips and metal guidance blades disposed in lengthwise extending slots, which engage with similar structures in other panels or other rails. Separate rails have mutually engageable lobes and lobe-engaging openings to allow a plurality of panels to be placed in any trade show booth configuration. The invention provides a trade show booth flexible in size and configuration, and lightweight in construction, which minimizes labor, assembly time, and cost.

The present invention further provides a trade show booth or office cubicle built from panels. Each panel includes a support structure having rails secured to the edges. Each rail has magnetic fastening strips and metal guidance blades disposed in lengthwise extending slots, which engage with similar structures in other panels or other rails. Separate rails have mutually engageable lobes and lobe-engaging openings to allow a plurality of panels to be placed in any trade show booth configuration. The invention provides a trade show booth flexible in size and configuration, and lightweight in construction, which minimizes labor, assembly time, and cost.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
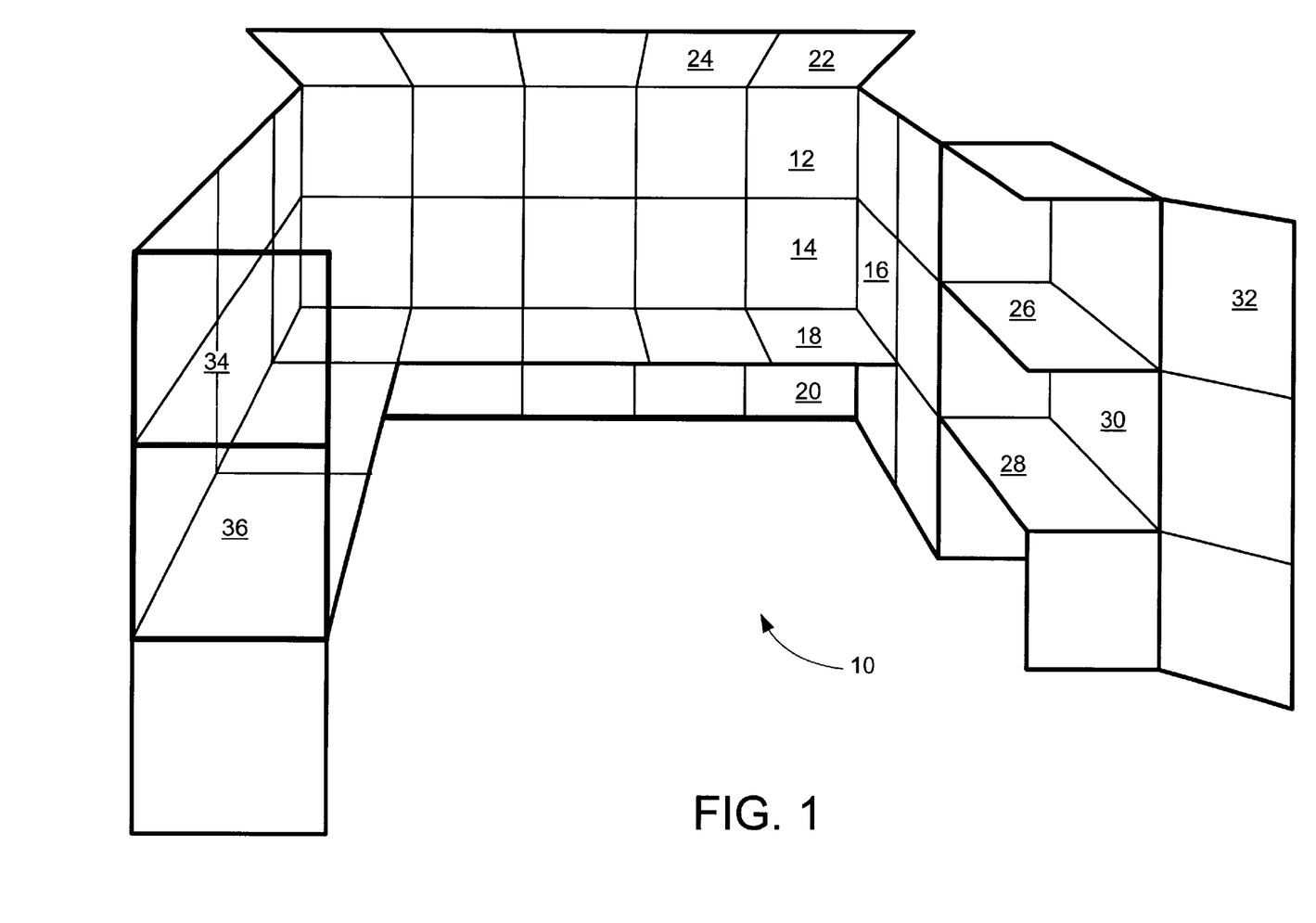
FIG. 1 is a view of a trade show booth in one configuration assembled in accordance with the present invention using panels of the present invention.

Referring now to FIG. 1, therein is shown a trade show booth 10 in one configuration assembled in accordance with the present invention using a plurality of interconnected panels of the present invention. A portion of the panels could be setup as a two dimensional display, a flat desk, a kiosk, or as a separate podium or platform. The booth, cubicle, display, furniture, and other configurations are collectively referred to as a "booth" for simplicity.

The term "horizontal" as used in herein is defined as a plane parallel to the floor and the term "vertical" refers to a direction perpendicular to the horizontal as just defined. Terms, such as "on", "above", "below", "side", "higher", "lower", "over", and "under", are defined with respect to the horizontal plane. The panels are described as having lengthwise extensions, widthwise extensions, and depth regardless of horizontal or vertical positioning. The lengths and widths may be different dimensions or be exactly the same as when the panel is square.

A first panel 12 is secured vertically above a second panel 14. The second panel 14 is secured at a right angle to a third panel 16 which is positioned vertically. The second and third panels 14 and 16 are further secured at right angles to a desk panel 18 which is secured at a right angle to a support panel 20. These panels could be three- by three-foot square panels.

The first panel 12 further supports and is connected to an overhanging 45-degree mirror panel 22. The mirror panel 22 is secured to an adjacent overhanging panel, a light panel 24.

At the front of the trade show booth 10 are a series of shelf panels 26 and 28, which are connected through a shelf-support panel 30 to a 45-degree position panel, such as a mirror panel 32.

Further, at the front of the trade show booth 10 are a pair of transparent panels 34 and 36.

Each of the panels in the trade show booth 10 could be of different sizes, such as having two-, three- or four-foot lengths by two-, three- or four-foot widths and one to three-inch thicknesses. Most are preferably of the same size and approximately the same construction as will hereinafter be described. FIG. 1 shows just one of the many combinations of constructions which are possible with the present invention. In addition, while being lightweight, the trade show booth 10 is capable of supporting substantial weight such that the desk panel 18 can in excess of a hundred pounds. The panels themselves can have various structures as will hereinafter be described.

Figures 2, 3, 4, 5, 6, 7:
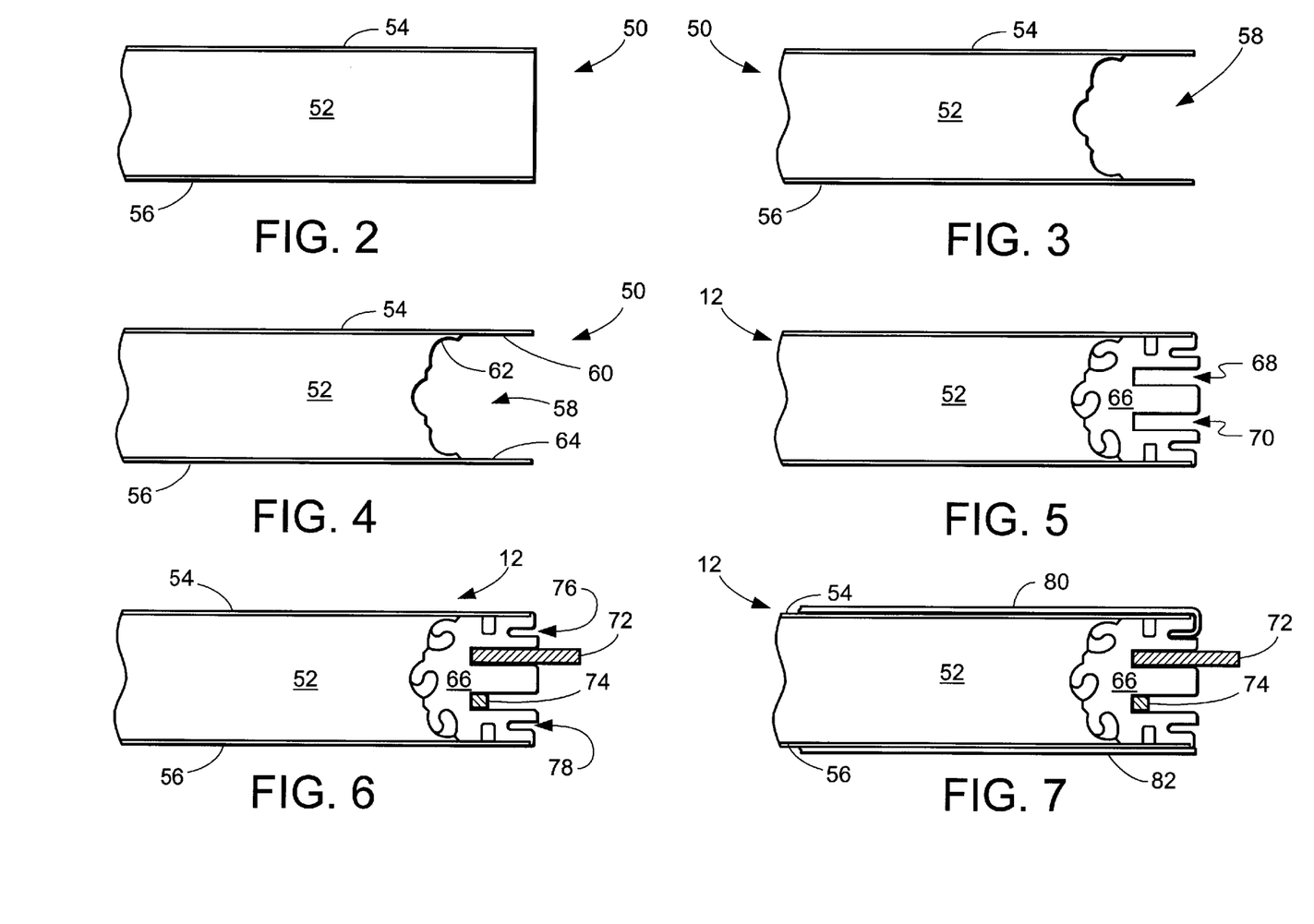
FIG. 2 is a view of an edge portion of a foam core board of a panel at an intial stage of manufacture.
FIG. 3 is a view of the structure of FIG. 2 with a configured volume of the foam core board removed.
FIG. 4 is a view of the structure of FIG. 3 with the surfaces of the configured volume coated with an adhesive.
FIG. 5 is a view of the structure of FIG. 4 showing a rail bonded inside the foam core board.
FIG. 6 is a view of the structure of FIG. 5 showing a guidance blade and a magnetic fastening strip inserted in the rail.
FIG. 7 is a view of the structure of FIG. 6 showing a fabric secured to the rail and a hard panel secured to the foam core board.

Referring now to FIG. 2, therein is a view of an edge portion of panel support structure, such as a foam core board 50, also known as "gator board", which consists of a rigid foam core 52 adhesively sandwiched between two fiberglass layers 54 and 56. The foam core board 50 is used because it is light weight and relatively strong to support other elements of the present invention. Other types of support structures could be used which are made of different materials such as paper or plastic honeycomb, wood, metal foam, etc.

Referring now to FIG. 3, therein is shown the structure of FIG. 2 having the rigid foam core 52 with a configured volume 58 removed. A conventional process such as routing may remove the configured volume 58.

Referring now to FIG. 4, therein is shown the structure of FIG. 3 having surfaces 60, 62, and 64 of the configured volume 58 coated with an adhesive.

Referring now to FIG. 5, therein is shown the structure of FIG. 4 having a rail 66 bonded into the configured volume 58 along a lengthwise edge of the foam core board 50 to form the first panel 12. The rail 66 extends substantially the length of the first panel 12 and has a pair of lengthwise extending slots 68 and 70. As would be evident, similar rails could be inserted along the opposite length of the first panel 12 as well as its widthwise edges depending on how the panels are to be arranged.

Referring now to FIG. 6, therein is shown the structure of FIG. 5 having a guidance blade 72 and a magnetic fastening strip 74 respectively bonded in the lengthwise extending slots 68 and 70. The two lengthwise extending slots 68 and 70 provide stability to the panels although the guidance blades and magnetic fastening strips in one lengthwise extending slot would provide operational fastening.

For edge panels, the guidance blade 72 would be left out.

In the described embodiment, magnetic fastening between guidance blades and magnetic fastening strips is used, but this does not preclude the use of other fastening methods such as Velcro tapes, weak adhesives, or the like.

The rail 66 further has lengthwise extending additional slots 76 and 78 provided therein parallel to the lengthwise extending slots 58 and 70.

Referring now to FIG. 7, therein is shown the structure of FIG. 6 having a fabric 80 secured inside the lengthwise extending slot 76 and tensioned to be tight against the fiberglass layer 54. An adhesive may be used to secure the fabric 80, or if stretchable, the fabric 80 can be removably wedged into place in the lengthwise extending slot 76.

On the underside of FIG. 7, therein is shown an widthwise and lengthwise extending subpanel 82 which could be of wood or plastic to convert the panel 12 to be a portion of a desk area, such as the desk panel 18 in FIG. 1 or a glass or plastic mirrored surface, such as the mirror panels 22 and 32 in FIG. 1, to provide a reflective surface.

Figure 8:
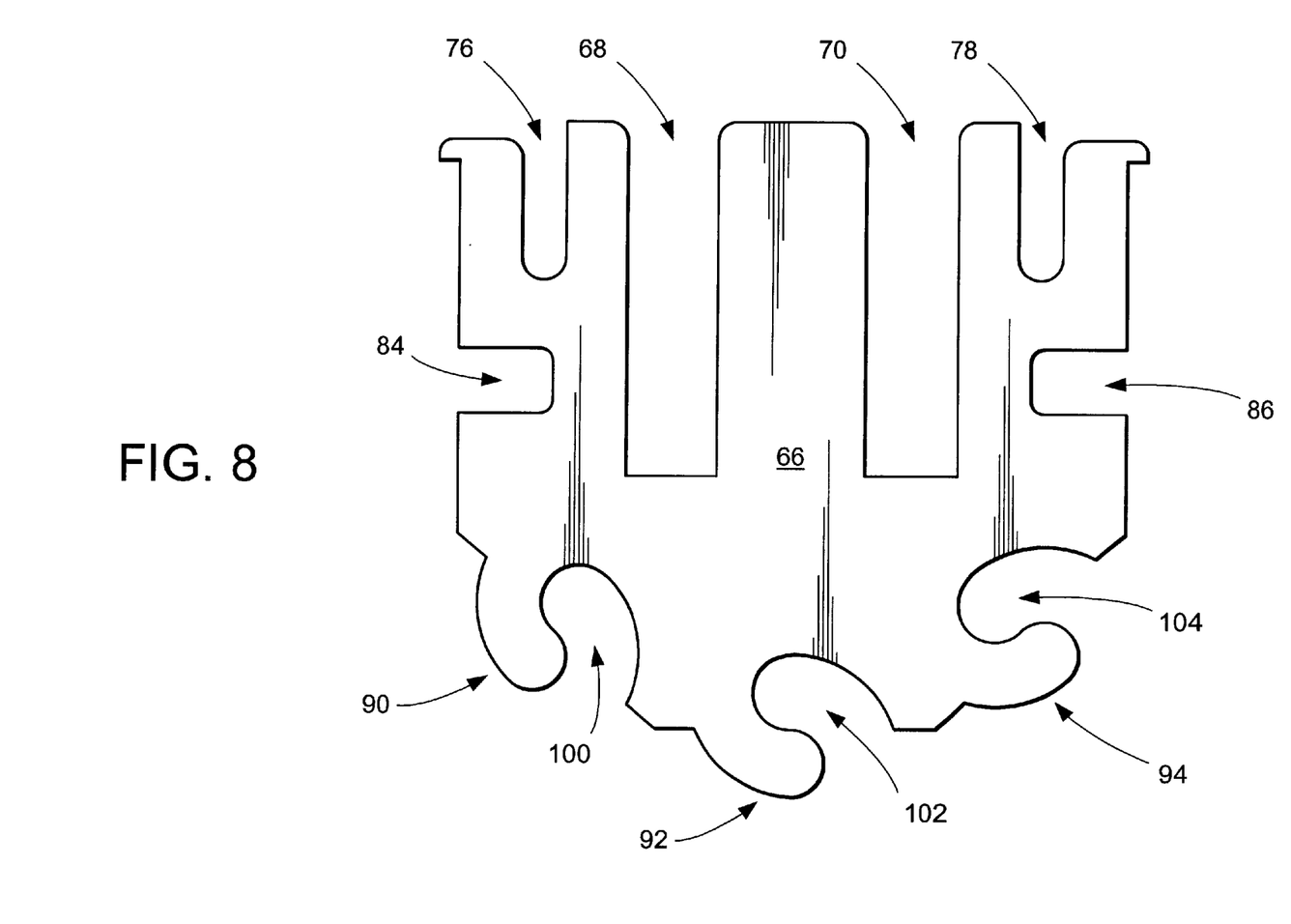
FIG. 8 is a cross-section of the rail of FIG. 5 showing grooves, lobes, and openings in the rail.

Referring now to FIG. 8, therein is shown a cross-section of the rail 66 having the lengthwise extending slots 68, 70, 76, and 78. The rail 66 further has lengthwise grooves 84 and 86 into which screws (not shown) can be self-tapped to hold decorative trim (not shown).

The rail 66 further has a series of lengthwise extending lobes 90, 92, and 94 and a series of lengthwise extending lobe-engagement openings 100, 102, and 104, which are designed to engage with matching lengthwise extending lobes on another rail at various angles, as will hereinafter be described.

Figure 9:
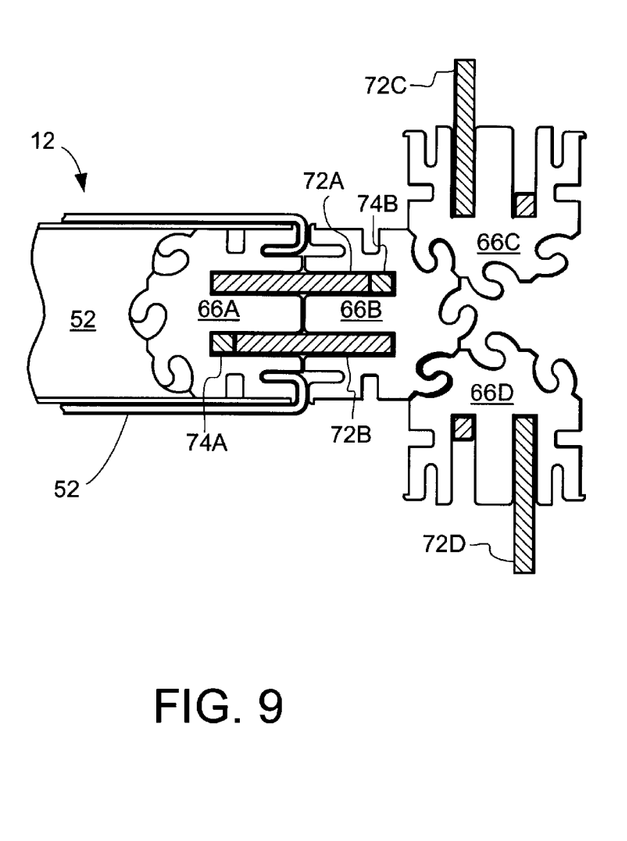
FIG. 9 is a view of perpendicularly interlocking rails assembled in accordance with the present invention.

Referring now to FIG. 9, therein is shown a view of perpendicularly interlocking rails assembled in accordance with the present invention. A rail 66A is abutting a rail 66B with a guidance blade 72A magnetically attracted to the magnetic fastening strip 74B of the rail 66B. Similarly, the guidance blade 72B is magnetically fastened to the magnetic fastening strip 74A in the rail 66A.

It should be noted that the rail 66B could be one which is bonded into another panel, in which case, the other panel would be in line with and parallel to the panel 50. For example, the panels 12 and 14 of FIG. 1 are in this configuration.

Two other rails 66C and 66D are shown having their lobes engaged in the openings of the rail 66B. The two rails 66C and 66D would be slid into engagement in a direction perpendicular to the cross-section so as to have their respective guidance blades 72C and 72D perpendicular to the guidance blade 72A and parallel to each other. With the addition of panels engaging the guidance blades 72C and 72D, a "T" intersection of panels would be formed. For example, the panel 18 is in this configuration with the panels 14 and 20 in FIG. 1.

Figure 10:
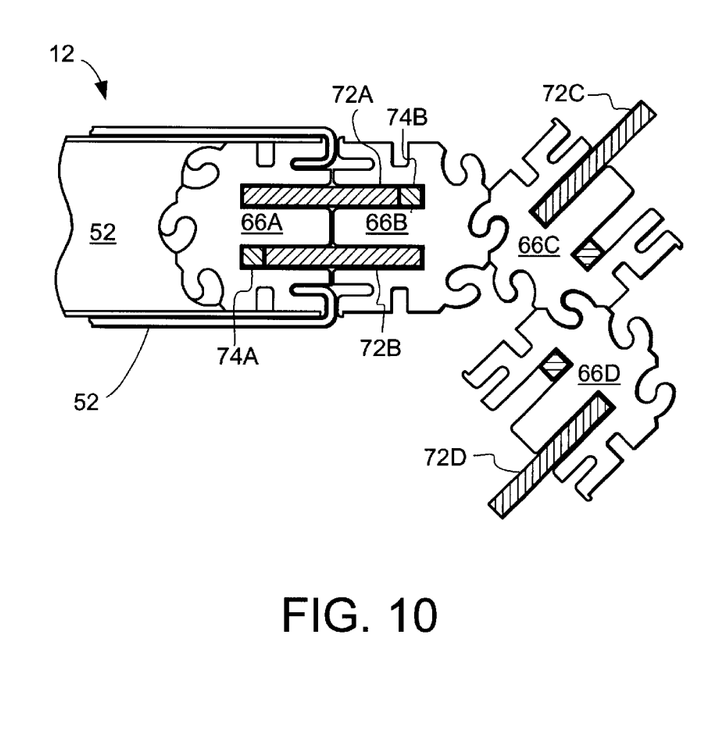
FIG. 10 is a view of angularly interlocking rails assembled in accordance with the present invention.

Referring now to FIG. 10, therein is shown a view of angularly interlocking rails assembled in accordance with the present invention. A rail 66A is abutting a rail 66B with a guidance blade 72A magnetically attracted to the magnetic fastening strip 74B of the rail 66B. Similarly, the guidance blade 72B is magnetically attracted to the magnetic fastening strip 74A in the rail 66A. This magnetic fastening is engaged and disengaged by moving the panels in directions perpendicular to the lengths of the panels, which are being respectively engaged or disengaged.

The rail 66C is shown having its lobes engaged in the openings of the rail 66B The rail 66D is shown having its lobes engaged in the openings of the rail 66C. The rails 66C and 66D would be slid into engagement in a direction perpendicular to the cross-section so as to have their respective guidance blades 72C and 72D at a 45° angle to the guidance blade 72A and parallel to each other. With the addition of panels engaging the guidance blades 72C and 72D, a "45° angle" intersection of panels would be formed. For example, the panel 12 is in part of this configuration with the panel 22 in FIG. 1.

As would be evident to those skilled in the art, the present invention allows an almost infinite number of different combinations for building the trade show booth 10 of FIG. 1.

Figure 11:
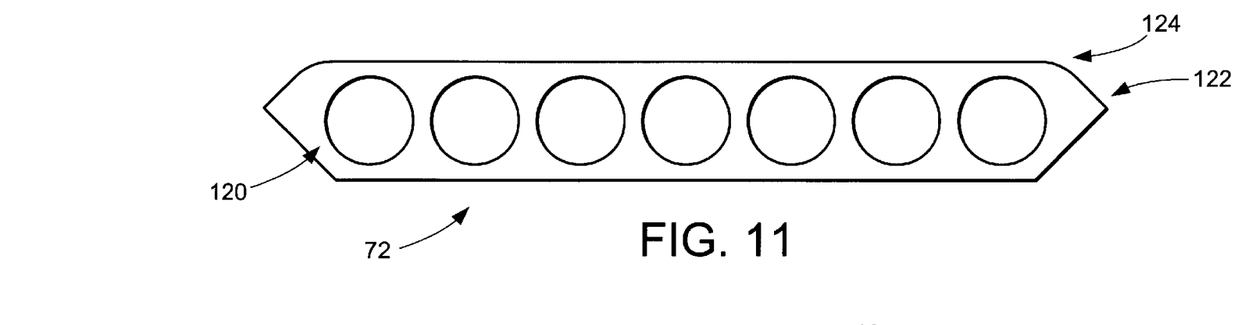
FIG. 11 is a side view of a guidance blade made in accordance with the present invention.

Referring now to FIG. 11, therein is shown a side view of a guidance blade 72 made in accordance with the present invention. The guidance blade 72 is reduced in weight by a plurality of holes 120. The guidance blade 72 is so named because it has a 45-degree guidance edge 122 with a radiused portion 124, which abuts with guidance blades in other panels and allows critical corner panels to be expeditiously guided into position. It was unexpectedly discovered that the guidance blade 72 is critical and required for rapid and accurate assembly.

Figure 12:
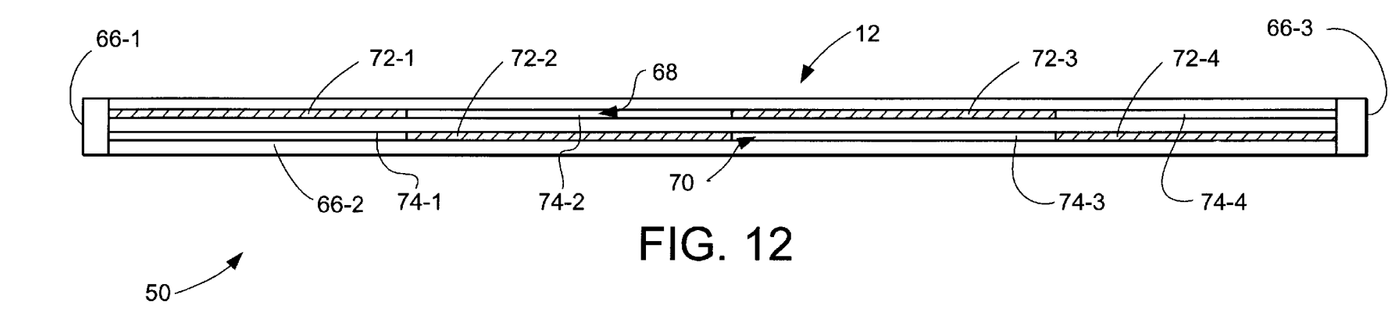
FIG. 12 is an edge view of the panel of FIG. 7 showing a rail with guidance blades and magnetic fastening strips alternating in the rails.

Referring now to FIG. 12, therein is shown an edge view of the first panel 12 having rails 66-1, 66-2, and 66-3 shown (one rail is hidden). In the rail 66-2, the guidance blades 72-1, 72-2, 72-3, and 72-4 alternate in the slots 68 and 70. Similarly, magnetic fastening strips 74-1, 74-2, 74-3, and 74-4 also alternate. This alternating arrangement provides high rigidity between the panels while at the same time permitting easy assembly and disassembly entirely without the use of tools. At the same time, the guidance blades shunt the magnetic field of the magnetic fastening strips so that magnetic computer media may be placed on the desk panels safely.

Figure 13:
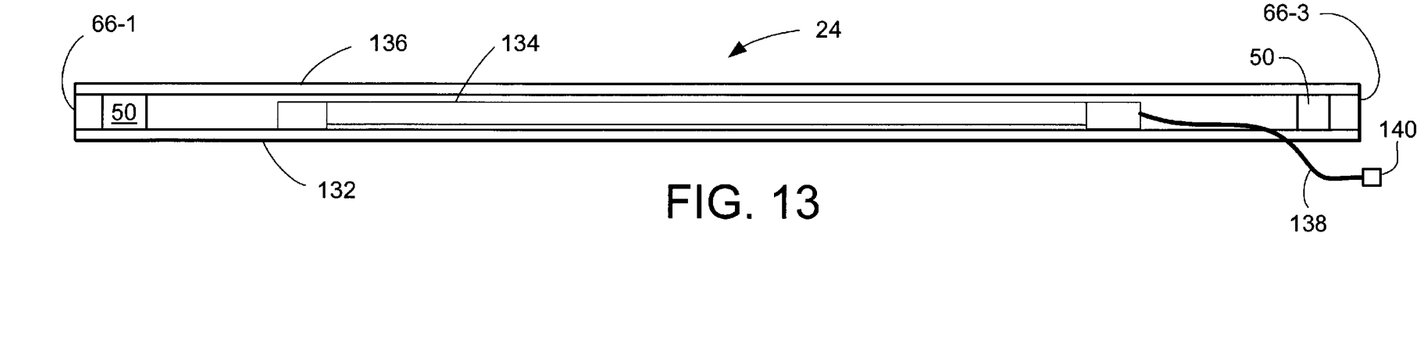
FIG. 13 is a cross-section view of a panel in accordance with another embodiment of the present invention.

Referring now to FIG. 13, therein is shown a cross-section view of the light panel 24. The foam core board 50 is hollowed out and has a back panel 132 secured to it for supporting an illumination device, such as a fluorescent light 134, behind a transparent or translucent panel 136. A cord 138 has a plug 140 for connection to an outlet or to the electrical connections of additional panel displays.

Similar panels to the light panel 24 can be made to contain electrical components, optical components, fluidic components, and a combination thereof for display devices such as clocks, animated light emitting diode screens, moving mechanisms, etc.

In the best mode, the panels are a series of two-foot by two-foot, two-foot by three-foot, and two-foot by four-foot panels all about one inch thick. The panels are designed to key into each other on an edge, and then be held together by magnetic force, enough force to hold the booth together, but not so much that it cannot be deliberately pulled apart. As a result, unique to the present invention, no tools are required for assembly or disassembly. The volume of the panels is minimal so they store compactly and a twenty-foot by twenty-foot trade show booth can fit into approximately one-third of a standard sized crate. Both sides of the panels may be covered in various fashions to provide a selection of colors as well as different surfaces. For example, hard surfaces can be provided for desk areas and transparent areas can be provided as windows. With the interlocking of the various lobes and openings, the trade show booth can be set up in virtually any configuration, even with square or rectangular podiums. The guidance blades make it possible to mate a panel to the inside corner of a set of other panels without having perfect alignment for it to drop into the two adjacent edges.

Further, designs have built-in lighting and other built-in structures are possible.

It will be noted that the same panel could be used in an office environment for cubicles. Today's companies experience an unprecedented level of change and reorganization. With the present invention, office cubicles could be partially or completely refigurable in a matter of minutes. Furthermore, the employees themselves without the use of skilled labor could implement these changes. The panels, or their edges, could be augmented with power distribution. Once interlocked, the structures are amazingly stable. A podium can support hundreds of pounds for example. For this reason, the system could be augmented to support work surfaces in an office environment. Because these work surfaces could be locked into panels, they could perform without legs to the ground providing more freedom of movement on the part of the cubicle occupant. Since the panels act as infinitely flexible building blocks, they never become obsolete.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A panel comprising:
   a widthwise and lengthwise extending support structure;
   a rail secured lengthwise to the support structure, the rail having a lengthwise extending slot provided therein;
   a magnetic fastening strip secured in the lengthwise extending slot; and
   a guidance blade secured in the lengthwise extending slot and extending widthwise therefrom adjacent to the fastening strip and of a material fastenable by magnetic attraction to the magnetic fastening strip, the guidance blade has a length extend extending lengthwise in the lengthwise extending slot and is provided with an edge having a radiused corner running into a 45-degree edge.

2. The panel as claimed in claim 1 including:
   a second rail adjacent the rail and having a lengthwise extending slot provided therein;
   a second magnetic fastening strip secured in the lengthwise extending slot of the second rail and fastened by magnetic attraction to the guidance blade in the rail; and
   a second guidance blade secured in the lengthwise extending slot of the second rail adjacent to the second magnetic fastening strip and of a material fastened by magnetic attraction to the magnetic fastening strip in the rail, the second guidance blade is provided with an edge having a radiused corner running into a 45-degree edge which abuts the guidance blade of the rail and extends widthwise into the lengthwise extending slot of the rail.

3. The panel as claimed in claim 2 wherein:

the second rail has a lengthwise extending lobe and a lengthwise extending lobe-engagement opening provided therein;

and including:

a third rail adjacent to the second rail and having a lengthwise extending lobe engaging the lengthwise extending lobe-engagement opening in the second rail and a lengthwise extending lobe-engagement opening provided therein engaging the lengthwise extending lobe of the second rail.

4. The panel as claimed in claim 3 wherein:

the third rail has a lengthwise extending slot provided therein;

and including:

a third magnetic fastening strip secured in the lengthwise extending slot of the third rail; and    a third guidance blade secured in the lengthwise extending slot of the third rail adjacent to the second magnetic fastening strip and of a material fastened by magnetic attraction to the magnetic fastening strip, the third guidance blade provided with an edge having a radiused corner running into a 45-degree edge.

5. A booth comprising:

a plurality of widthwise and lengthwise extending support structures;

a plurality of rails secured lengthwise to the plurality of support structures, the plurality of rails each having a lengthwise extending slot provided therein;

a plurality of fastening strips disposed in the lengthwise extending slots; and a plurality of guidance blades disposed in the lengthwise extending slots adjacent to the fastening strip and of a material fastenable to the fastening strip, the plurality of guidance blades for guiding the plurality of support structures into engagement to fasten the plurality of support structures together to form the booth, the plurality of guidance blades extend lengthwise in the lengthwise extending slot and are provided with edges having a radiused corners running into 45-degree edges for causing the plurality of support structures to be guided into proper alignment when moved together.

6. The booth as claimed in claim 5 wherein:

the plurality of fastening strips is magnetic; and the plurality of guidance blades is magnetically fastenable to the plurality of fastening strips in different ones of the plurality of support structures to allow the booth to be assembled and disassembled without tools.

7. The booth as claimed in claim 5 wherein:

the plurality of support structures are of a plurality of different materials and configurations;

the plurality of rail each have a lengthwise extending additional slot provided therein;

and including:

a plurality of widthwise and lengthwise extending fabrics insertable into the lengthwise extending additional slot of plurality of rails to be secured thereto and to extend lengthwise and widthwise on the plurality of support structures.

8. The booth as claimed in claim 5 wherein:

the plurality of support structures are foam core boards;

the plurality of rails each have lengthwise extending additional slots provided therein;

and including:

a plurality of widthwise and lengthwise extending fabrics insertable into the lengthwise extending additional slots to be secured thereto and to extend lengthwise and widthwise on the plurality of foam core boards whereby both the front and back of the foam core board are covered.

9. The booth as claimed in claim 8 wherein:

the second plurality of rails are placed at different angles to each other from a group consisting of 45 degrees, 90 degrees, 180 degrees, and 135 degrees.

10. The booth as claimed in claim 5 including:

a plurality of widthwise and lengthwise extending subpanels secured to the plurality of support structures, the plurality of subpanels of a material selected from a group consisting of an opaque material, a translucent material, a transparent material, a reflective material, a colored material, and a combination thereof.

11. The booth as claimed in claim 5 wherein:

the plurality of support structure is hollow;

and including:

a plurality of components disposed within the hollows of the plurality of support structures and selected from a group of components consisting of electrical components, optical components, fluidic components, and a combination thereof.

12. The booth as claimed in claim 5 wherein:

the plurality of rails each has a second lengthwise extending slot provided therein;

the plurality of fastening strips each having a fixed length;

the plurality of guidance blades each having the fixed length and alternately disposed in the lengthwise extending slot and the second lengthwise extending slot to have the plurality of guidance blades engage lengthwise extending slots in different of the plurality of rails in contact with the plurality of fastening strips in the different plurality of rails.

13. The booth as claimed in claim 5 including:

a second plurality of rails each having a lengthwise extending lobe, a lengthwise extending lobe-engagement opening provided therein, and a lengthwise extending slot provided therein, the second plurality of rails each having the lengthwise extending lobe thereof engaging the lengthwise extending lobe-engagement opening of another of the second plurality of rails to place the second plurality of rails at different angles to each other;

a second plurality of fastening strips disposed in the lengthwise extending slots of the second plurality of rails; and a second plurality of guidance blades disposed in the lengthwise extending slots of the plurality of second rails adjacent to the second plurality of fastening strips and fastened to the plurality of fastening strip.

14. A booth comprising:

a plurality of panels containing magnetic fasteners and guidance blades in the edges thereof whereby panels can be assembled and disassembled without tools by sliding the guidance blades into and out of abutting engagement and holding the plurality of panels together by magnetic attraction; and a plurality of rails containing magnetic fasteners and guidance blades in the edges thereof whereby rails can be assembled to panels and disassembled from panels without tools by sliding the guidance blades into and out of engagement, the plurality of rails having lobes and lobe-engagement openings whereby rails can be assembled to and disassembled from rails without tools by sliding the lobes of one of the plurality of rails into and out of the lobe-engagement openings of another of the plurality of rails.

15. The booth as claimed in claim 14 wherein:

the plurality of rails is configured to allow a portion of the plurality of panels to be at different angles to others of the plurality of panels.

* * * * *